United States Patent

[11] 3,596,318

| [72] | Inventors | William T. Kyritsis<br>Beverly Farms;<br>Marvin C. Picard, Leominster, both of, Mass. |
|---|---|---|
| [21] | Appl. No. | 789,497 |
| [22] | Filed | Jan. 7, 1969 |
| [45] | Patented | Aug. 3, 1971 |
| [73] | Assignee | USM Corportaion<br>Flemington, N.J. |

[54] MOLD ASSEMBLY FOR MOLDING OF FOAMED PLASTIC ARTICLES
12 Claims, 7 Drawing Figs.

[52] U.S. Cl...................................................... 18/5 P,
18/12 F, 18/42 D
[51] Int. Cl...................................................... B29d 27/04
[50] Field of Search............................................ 18/5 P, 5 F,
12 F, 42 D, 42 M, DIG. 14; 249/65, 82

[56] References Cited
UNITED STATES PATENTS

| 1,637,708 | 8/1927 | Porter ......................... | 25/27 |
| 3,249,486 | 5/1966 | Voisinet et al................ | 18/5 X |
| 3,389,198 | 6/1968 | Taber........................... | 249/82 X |

*Primary Examiner*—H. A. Kilby, Jr.
*Attorneys*—W. Bigelow Hall, Richard A. Wise and Scott R. Foster ABSTRACT: Mold assembly for the injection foam molding of a boxlike container having interior partitions dividing the container into a plurality of cells, the mold assembly being characterized by means for moving inside and outside wall-forming portions of the mold cavity whereby to permit expansion of all of the walls of the molded container, including the inside partitions.

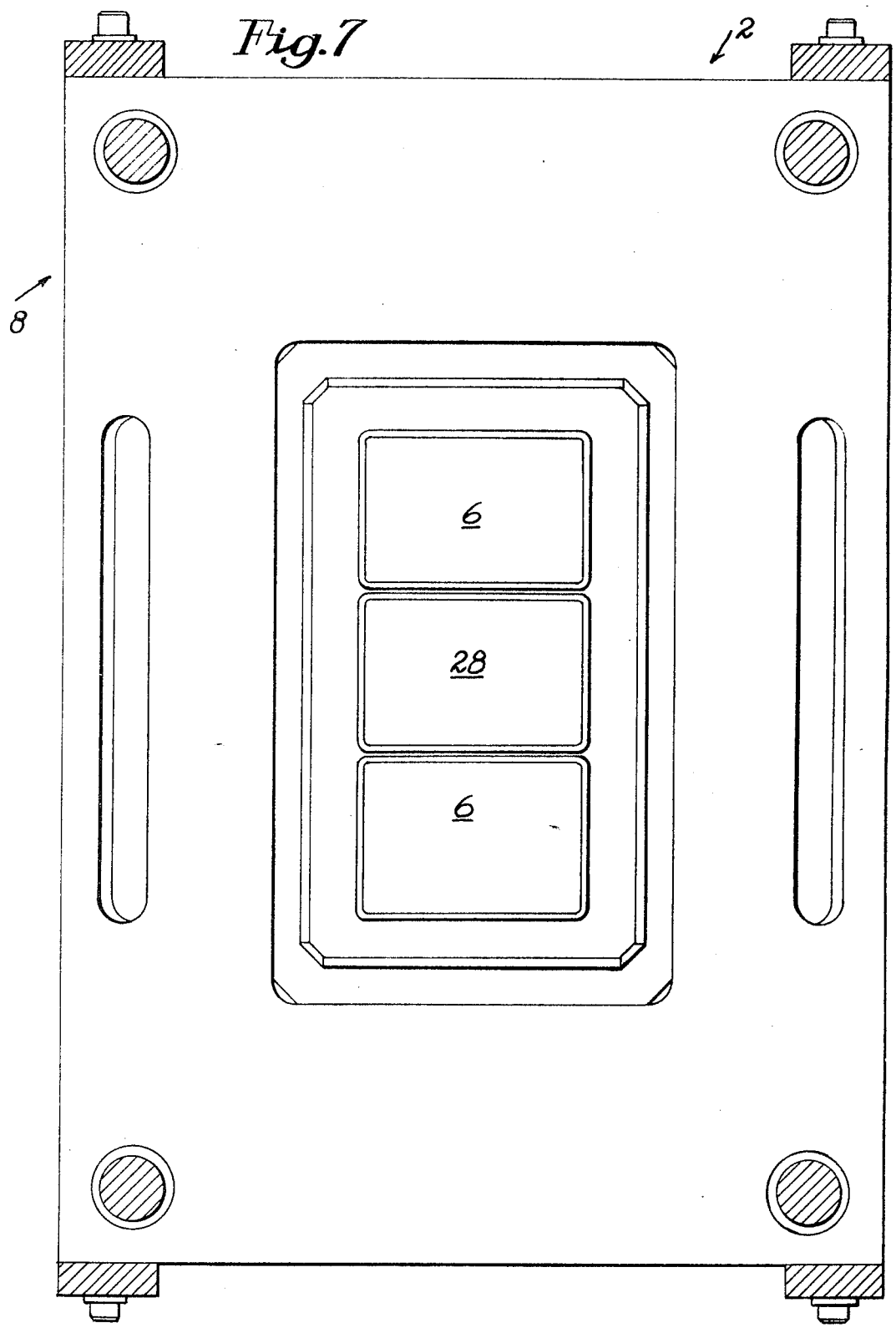

3,596,318

MOLD ASSEMBLY FOR MOLDING OF FOAMED PLASTIC ARTICLES

BACKGROUND OF THE INVENTION

1. Field of the Invention

This invention relates to mold assemblies and is directed more particularly to a mold assembly for the injection molding of foamed plastic articles.

2. Description of the Prior Art

The injection molding of foamed plastic articles is generally facilitated by the use of a mold cavity having a movable mold member which permits enlargement of the mold cavity after injection of material thereinto whereby to allow foaming and consequent expansion of the molding material. By and large, such molding has been restricted to objects of relatively noncomplex configuration such as sheet materials, slablike articles, shoe soles, and the like. Such items could be readily molded utilizing a single movable mold member.

The advantages of injection foam molding are equally desirable in the manufacture of more complex items, but have generally been foregone because of the necessity of providing for expansion of the mold cavity in all areas where foaming is desired. The problem has been especially troublesome where the molded article has included interior portions, such as interior partitions disposed within the molded outside shell of container.

For example, the molding of boxlike article having interior partition means requires that at least one mold surface forming each of the walls of the box be movable in order to permit expansion of the walls of the box. In addition, it is necessary that interior portions of the mold, forming the inside of the box and the partition walls, be movable in order to permit expansion of the interior partitions.

SUMMARY OF THE INVENTION

It is an object of the present invention to provide a mold assembly for the injection molding of foamed plastic articles of complex shapes.

A further object of the invention is to provide a mold assembly having facility for molding a boxlike or containerlike article having interior partition means dividing the interior of the article into a plurality of cells, and having means for permitting expansion of all of the molded walls of the article including the partition means.

With the above and other objects in view, as will hereinafter appear, a feature of the present invention is the provision of a mold assembly for the molding of a boxlike container having interior partition means dividing the container into a plurality of cells, the mold assembly having means for moving the wall forming portions of the mold cavity, whereby to permit foaming and consequent expansion of the molded walls of the container, including movable means for forming the interior partition means of the molded container.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention, such as in mold assemblies having movable mold members for molding articles of various configurations with foam material.

BRIEF DESCRIPTION OF THE DRAWINGS

Reference is made to the accompanying drawings in which there is shown an illustrative embodiment of the invention from which its novel features and advantages will be apparent.

FIG. 7 is an elevational view of another portion of the mold assembly.

DESCRIPTION OF THE PREFERRED EMBODIMENT

Figure 1:
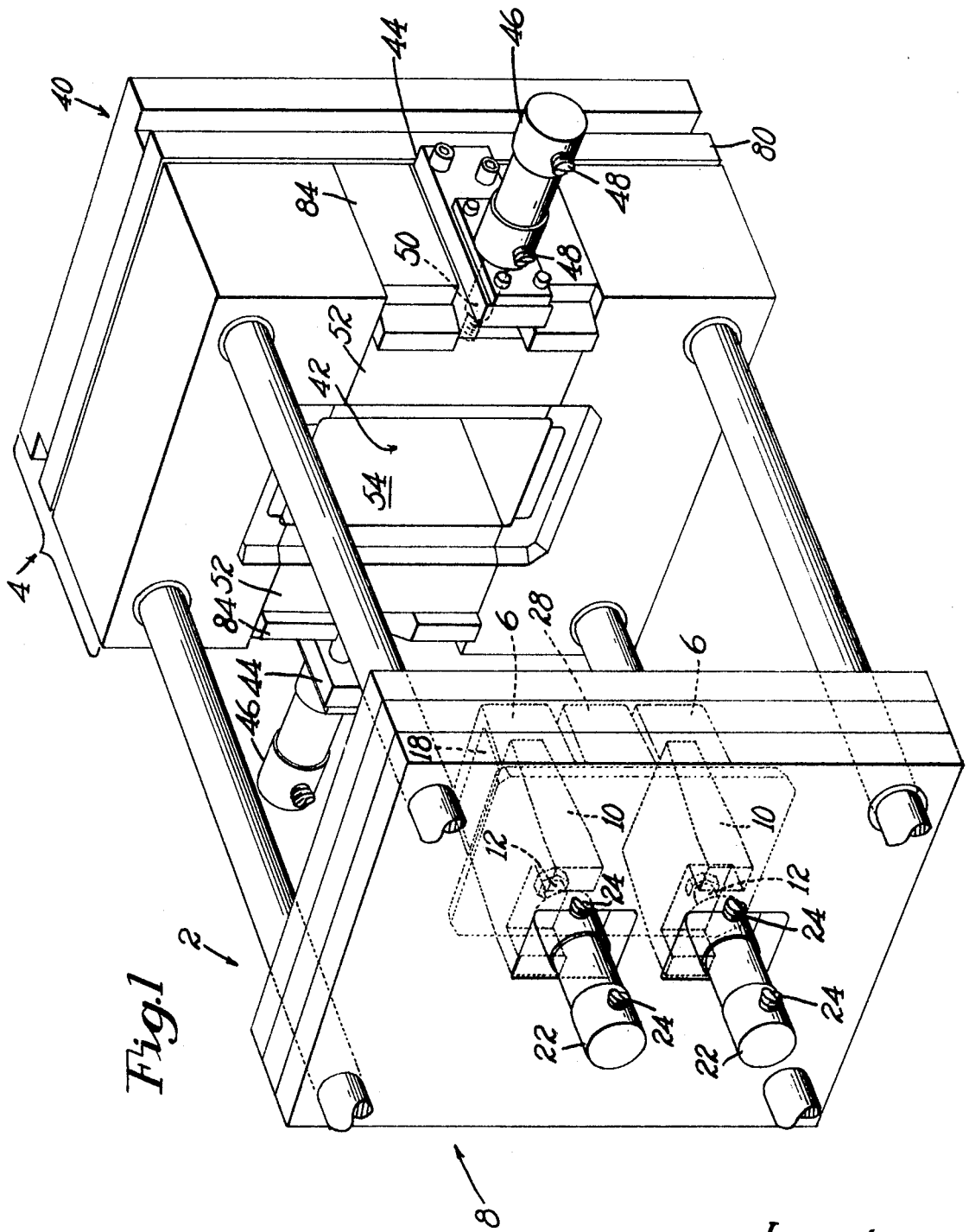
FIG. 1 is a perspective view of one form of mold assembly illustrative of an embodiment of the invention.
Figure 2:
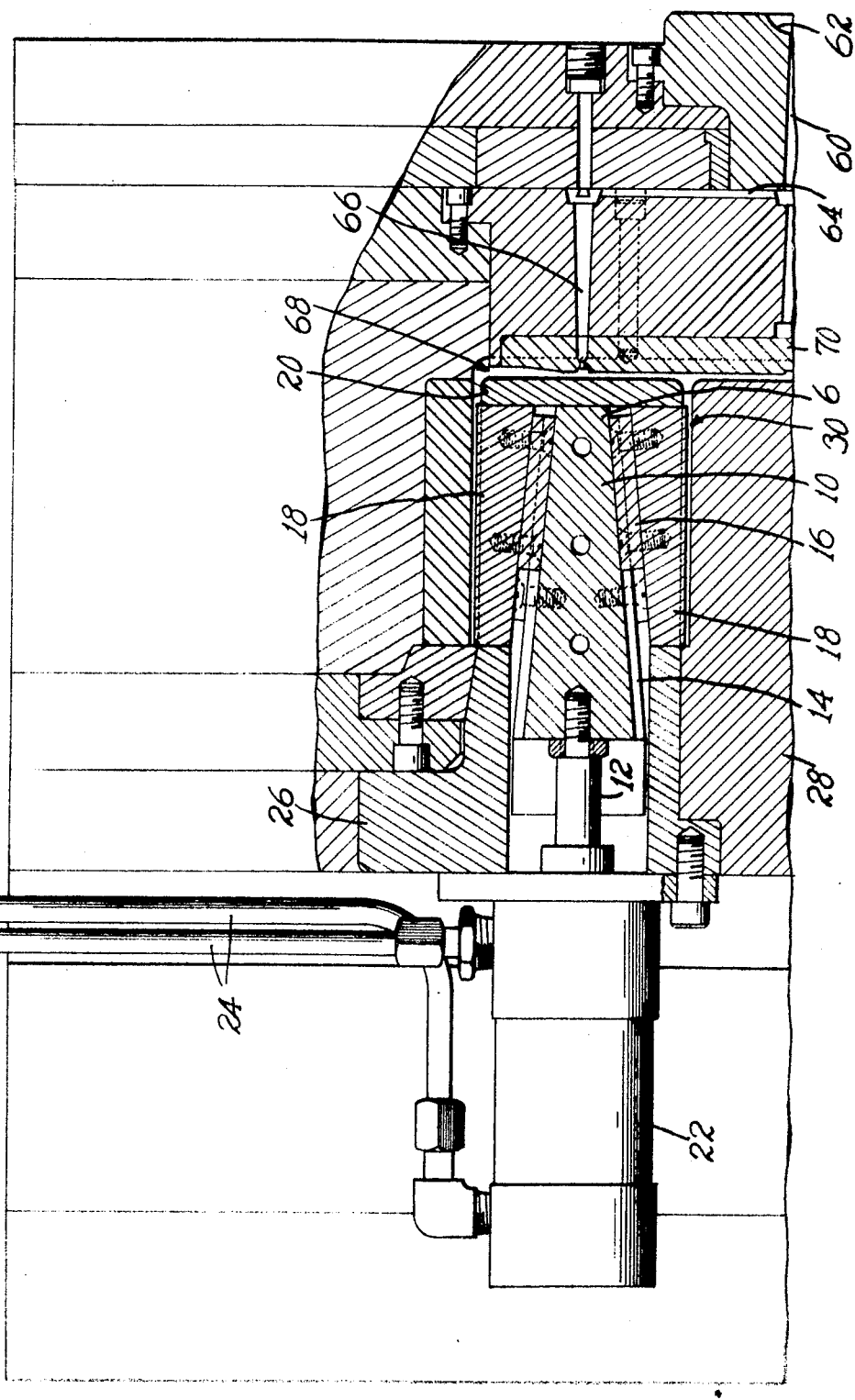
FIGS. 2 and 3 are complementary elevational views partly in section along the center line of the mold, FIG. 2 showing a portion of the mold assembly in a nonexpanded condition, and FIG. 3 showing a complementary portion of the mold assembly in the expanded condition.

Referring to FIGS. 1—5, it will be seen that the illustrative mold assembly includes a male mold component 2 and a female mold component 4. The male mold component 2 includes protrusions 6 mounted on platen means 8. Referring to FIG. 2, it will be seen that each protrusion 6 comprises a cam member 10 disposed on a piston rod 12. Each cam member 10 has disposed thereon runways or tracks, as for example T-shaped slideways 14, on which are slidably disposed blocks 16 connected to mold members 18. An end member 20 is disposed on the free end of protrusion 6.

Figure 3:
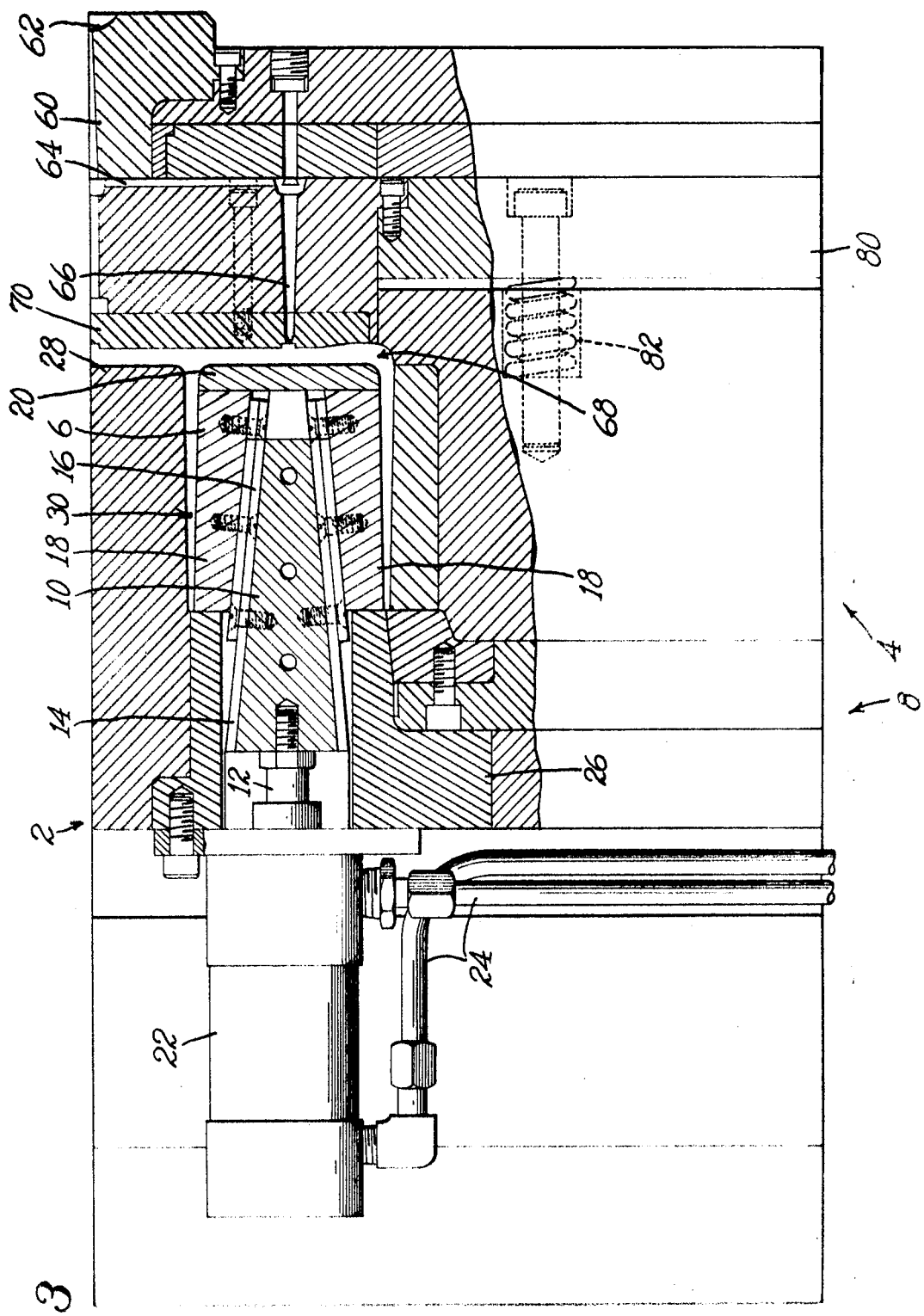

Axial movement of the cam member 10 causes transaxial movement of the mold members 18 to enlarge the mold cavity and permit foaming of injection molding material therein. Referring particularly to FIGS. 2 and 3, it will be noted that cylinders 22 provide such movement and are mounted on the platen means 8, receiving the piston rods 12. Accordingly, the cam members 10 are movable responsive to operation of the cylinders 22, each cylinder 22 having inlet and outlet means 24 for conducting pressurized fluid to and from the cylinder. Each of the mold members 18 is disposed between one of the end members 20 and a base member 26. The mold members 18 are thus constrained to move in directions normal to the direction of movement of the cam members 10. Accordingly, as the piston rods 12 are caused to move into the cylinders 22, or leftwardly, as viewed in FIGS. 2 and 3, the mold members 18 are caused, by sliding movement of the blocks 16 on the slideways 14, to move in directions inwardly toward the axes of the cam members 10, from positions illustrated in FIG. 2 to positions illustrated in FIG. 3.

Secured to the platen means 8 is a static protrusion 28. It will be seen in FIGS. 2 and 3 that a mold cavity portion 30 is formed between the innermost mold member 18 of a protrusion 6 and the static protrusion 28. Moving of the mold member 18 toward the axis of the cam member 10 enlarges the mold cavity portions 30, whereby to permit expansion of injection mold material located in such mold cavity portions.

Figure 4:
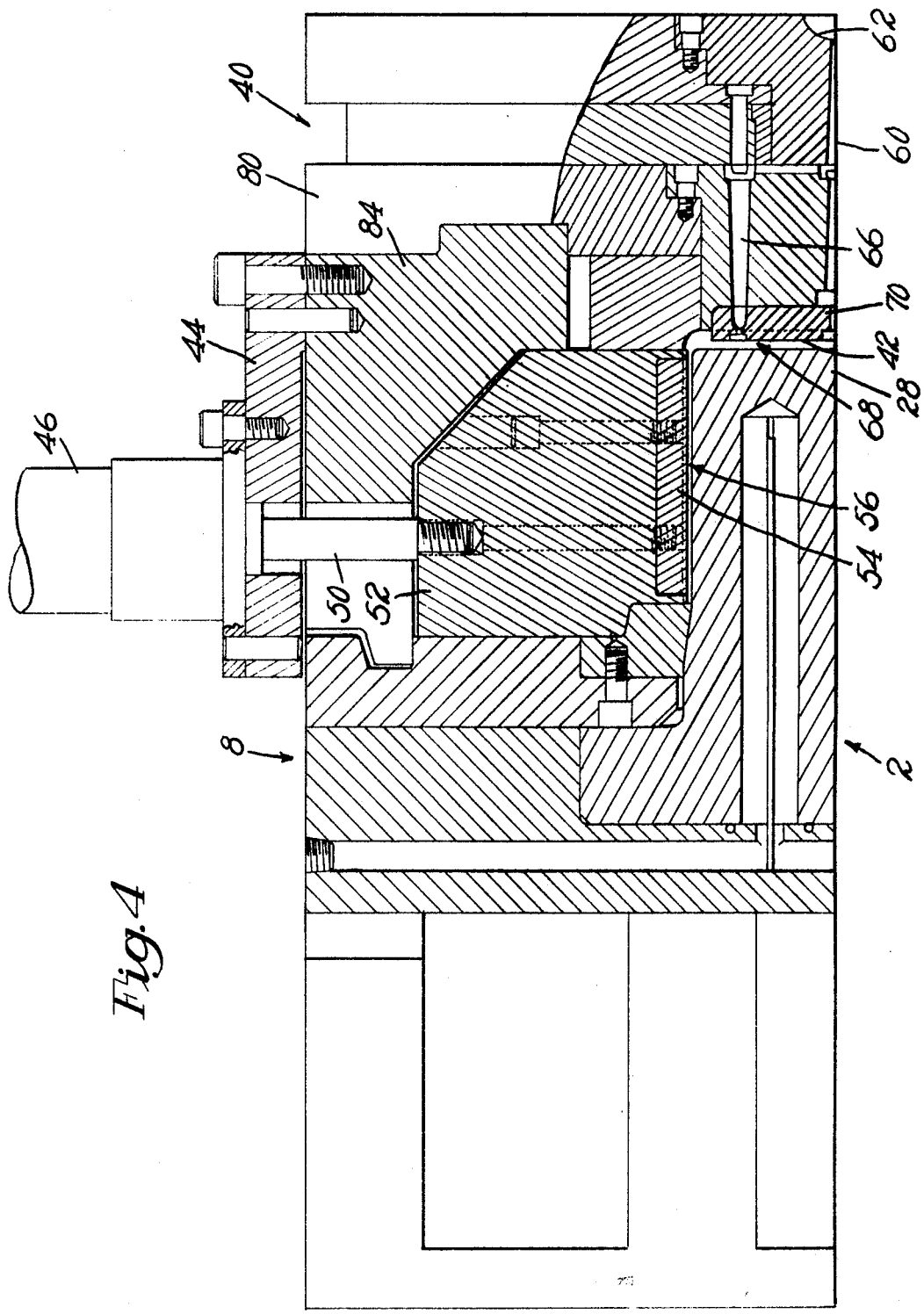
FIGS. 4 and 5 are complementary plan views in section along the center line of the mold, FIG. 4 showing a portion of the mold assembly in nonexpanded condition, and FIG. 5 showing a complementary portion of the mold assembly in expanded condition.
Figure 5:
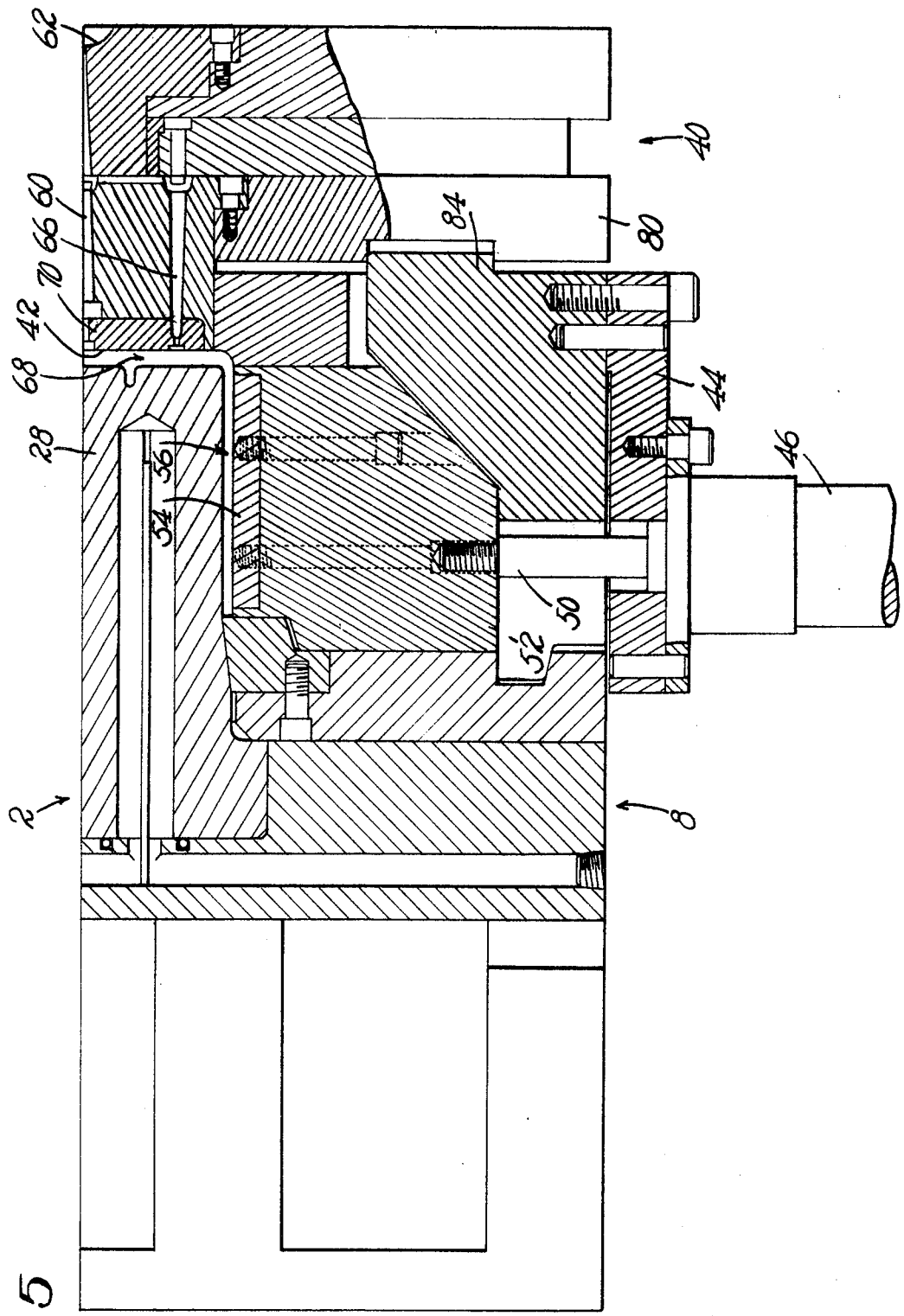

Referring to FIGS. 1, 4 and 5, it will be seen that the female mold component 4 includes platen means 40 defining a mold cavity 42. The platen means 40 supports bracket members 44 on which are mounted double-acting cylinders 46 having inlet and outlet means 48 for the admission and expulsion of pressurized fluid from the cylinders. Piston rods 50 extend from the cylinders 46 and are connected to side mold carriers 52 (FIGS. 4 and 5) on which are mounted side mold members 54. Upon operation of the cylinders 46 the side mold members 54 are movable from a position illustrated in FIG. 4 to a position illustrated in FIG. 5. Such movement permits expansion of injection molding material disposed in mold cavity portions 56 located between the side mold members 54 and the protrusions 6, 28.

Figure 6:
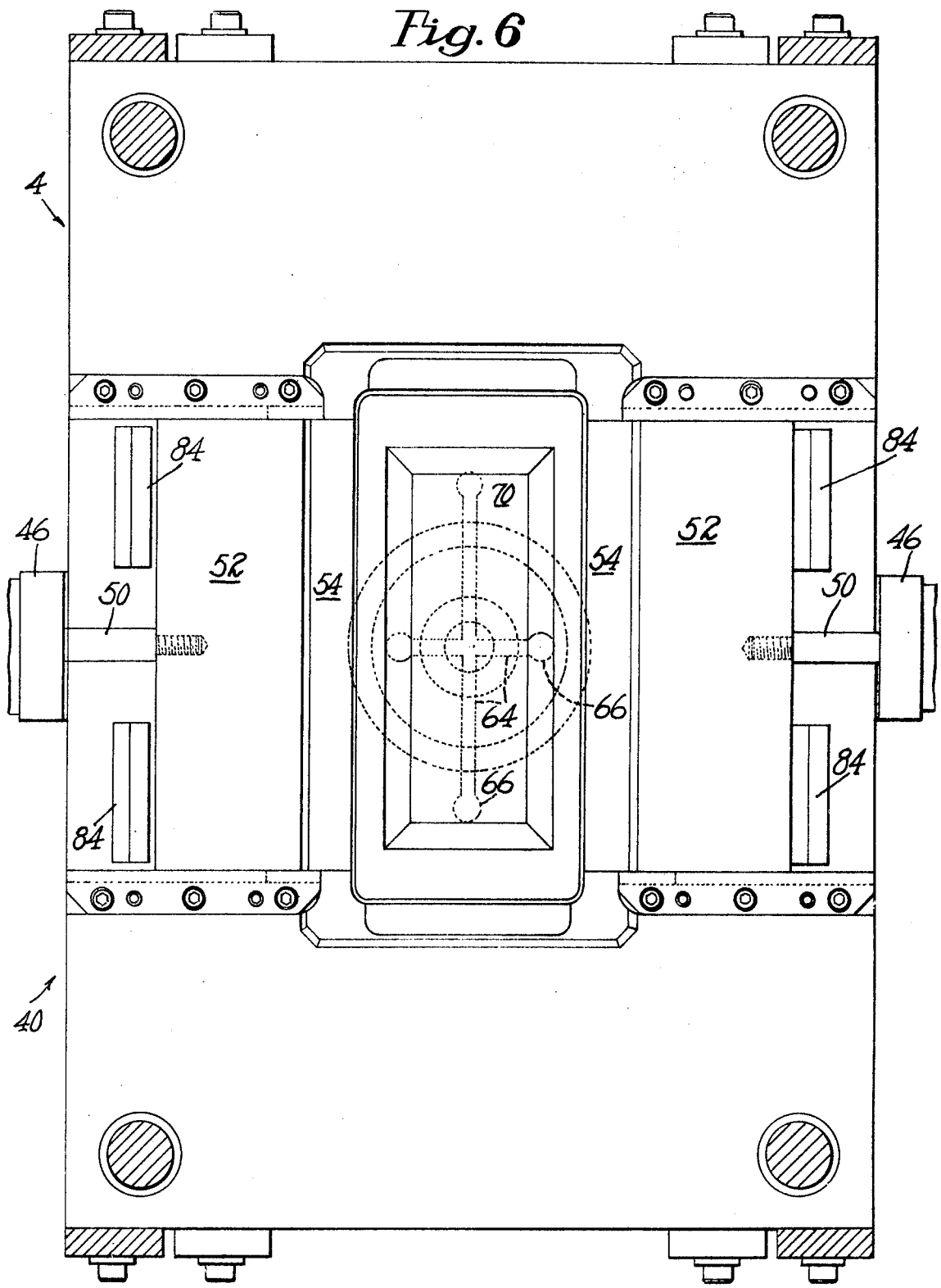
FIG. 6 is an elevational view of a portion of the mold assembly.

Referring to FIGS. 2—5, it will be seen that the female mold component 4 is also provided with sprue means 60 for interconnecting a source of molding material (not shown) and the mold cavity. Injection-molding material is conducted by the sprue means 60 from an injection-molding machine nozzle (not shown) received in a recess 62 through a system of runners 64 (see also FIG. 6) to mold cavity inlets 66.

Referring to FIGS. 1—5, it will be seen that the platen means 40 is movable in directions toward and away from the free ends of the protrusions 6, 28 to enlarge a mold cavity portion 68 (FIGS. 2—5) disposed between said protrusions and a bottom mold member 70 attached to the platen means 40, whereby to permit expansion of injection-molding material located in said mold cavity portion. Means for moving the female mold component 4 relative to the male mold component 2 is not shown but may be hydraulic moving means as is commonly used in the trade. The female mold component 4 may be directly connected to the injection-molding machine used therewith, if desired.

In operation, the nozzle of an injection-molding machine is brought into engagement with the recess 62 and injection is started through the sprue means 60, runners 64, and through the inlets 66 into the mold cavity 42. After the mold cavity is filled and injection has been terminated, pressure applied upon the female mold component 4, as by the plasticator or hydraulic means (not shown) is released, whereby to permit a spring biased portion 80 (FIG. 3) of the female mold component to move outwardly from the male mold component from the position shown in FIGS. 2 and 4 to the position shown in FIGS. 3 and 5. Such movement enlarges the portion 68 of the mold cavity, permitting expansion of the molding material therein. Coil spring means 82 may be utilized to facilitate movement of the mold portion 80 relative to the remainder of the female mold component.

Coincident with the release of pressure on the female mold component 4 and movement of the mold portion 80, pressurized fluid is admitted to the cylinders 46 and 22 to move other mold members simultaneously with the member 70.

Referring to FIGS. 4 and 5, it will be seen that with the mold in the unexpaned position (FIG. 4) the side mold carriers 52 are in spaced relation with stationary members 84 and the cylinders 46 are pressurized to urge the mold carriers toward the protrusions 6, 28. Simultaneously, with the movement of the movable mold member 80, and, therefore, the bottom mold member 70, the cylinders 46 are pressurized to move the side mold carriers 52 in a direction away from the protrusions 6, 28, and into engagement with the member 84 to enlarge portions 56 of the mold cavity.

Fluid under pressure supplied to the cylinders 22 causes movement of the piston rods 12, and therefore the cam members 10, toward their respective cylinders 22. Such movement causes the mold members 18 to move inwardly toward each other (FIGS. 2 and 3) between the base members 26 and the end members 20. Such movement enlarges the mold cavity portions 30 whereby to permit expansion of the interior partitions of the molded container, as well as the end walls of the container.

Thus it will be seen that the bottom wall of the container, the four sidewalls, and the interior partitions, are permitted to expand simultaneously. After completion of the molding operation, the male mold component 2 and female mold component 4 are separated leaving the molded container exposed and positioned on the protrusions 6, 28 from which the molded article may readily be removed.

Having thus described our invention what we claim is new and desire to secure by Letters Patent of the United States is:

1. A mold assembly for injection molding of an article having interior partitions dividing the article into a plurality of cells, said mold assembly comprising mold members forming a closed cavity with movable portions of the members initially defining walls and partitions of lesser thickness than that of said article, inlet means for injecting-molding material into and filling said cavity, and means for moving said mold member portions after injection of said molding material into said cavity to expand the walls and portions of the molded article while said cavity remains closed.

2. The invention, according to claim 1, in which said mold members comprise a male mold component and a female mold component movable to engage each other to close said mold cavity.

3. The invention, according to claim 2, in which a portion of said female mold component is movable in a direction away from said male mold component while said male and female mold components remain engaged and maintain the mold cavity closed, whereby to enlarge a portion of said cavity.

4. The invention, according to claim 2, in which said male mold component includes a protrusion for forming said walls of said article.

5. The invention, according to claim 4, in which said protrusion comprises members movable inwardly of said protrusion whereby to enlarge portions of said cavity.

6. The invention, according to claim 5, in which said protrusion includes cam means operable to move said movable members.

7. The invention, according to claim 3, in which said male mold component includes a protrusion comprising members movable inwardly of said protrusion whereby to enlarge further portions of said cavity.

8. A mold assembly for injection molding an article of foam material, said mold assembly comprising a male mold component and a female mold component movable to engage each other to form a closed mold cavity, said male mold component including a protrusion received by said female mold component, said protrusion comprising members movable inwardly of said protrusion whereby to enlarge portions of said mold cavity, and means for moving said movable protrusion members after injection of foam molding material into and filling said cavity, whereby to permit expansion of said material.

9. The invention, according to claim 8, in which a portion of said female mold component is movable in a direction away from said male mold component protrusion while said male and female mold components remain engaged, whereby to enlarge a further portion of said cavity.

10. The invention, according to claim 8, in which a plurality of female mold component members are movable in directions away from said protrusion while said male and female mold components remain engaged, whereby to enlarge further portions of said cavity.

11. A mold assembly for injection molding an article of foam material, said assembly being mounted between platens relatively movable toward and away from each other for fully closing the assembly to form a closed cavity of reduced volume into which a foamable material is injected to fill said cavity, for partially opening the assembly to enlarge the closed cavity so the material can foam, and for fully opening the mold assembly for removal of the completed article, said mold assembly comprising one component carried by one platen and forming a portion of said cavity and another component carried by the other platen and forming an expandable portion of said cavity, said other component including a part engageable with said one component to close and form a portion of said cavity and a member projecting through said part to form the cavity in its reduced volume condition when the assembly is fully closed, and biasing means between said part and said member for maintaining said part and said one component in engagement to maintain the cavity closed when the platens are moved away from each other and the assembly is partially opened, whereby said member is retracted to enlarge the closed cavity to permit material filling said cavity to expand.

12. The invention according to claim 11 in which the one mold component is secured to one platen, the retractable member is secured to the other platen and said part is mounted for relative movement on said member.